United States Patent

[11] 3,571,531

[72] Inventors Harvey Rubin
New York, N.Y.;
Robert M. Taylor, Middletown; Edward J. Wilkens, Jr, Freehold, N.J.

[21] Appl. No. 779,737
[22] Filed Nov. 29, 1968
[45] Patented Mar. 16, 1971
[73] Assignee Bell Telephone Laboratories, Incorporated
Murray Hill, Berkeley Heights, N.J.

[54] SELECTIVE AUTOMATIC SERVICE OBSERVING IN COMMUNICATION SYSTEMS
11 Claims, 4 Drawing Figs.

[52] U.S. Cl. 179/175.2
[51] Int. Cl. H04m 3/24
[50] Field of Search 179/27.01, 175.2 (C), 175.2

[56] References Cited
UNITED STATES PATENTS
3,155,781 11/1964 Ulmer 179/175.2(C)
2,981,806 4/1961 Middaugh 179/175.2(C)

*Primary Examiner*—Kathleen H. Claffy
*Assistant Examiner*—Thomas W. Brown
*Attorneys*—R. J. Guenther and James Warren Falk

ABSTRACT: A service observing system is disclosed having circuitry which connects to a group of lines and which selectively connects either terminating calls only or originating calls only to a service observing position. A seizure detector is associated with each observed line for detecting seizures in the selected mode. The first of the observed lines seized in the selected mode is connected to the observing position immediately upon seizure for observation of the detected call.

Patented March 16, 1971 3,571,531

3 Sheets-Sheet 1

INVENTORS H. RUBIN
R. M. TAYLOR
E. J. WILKENS, JR
BY Howard R Popper ATTORNEY

SELECTIVE AUTOMATIC SERVICE OBSERVING IN COMMUNICATION SYSTEMS

BACKGROUND OF THE INVENTION

This invention relates to service observing in communications systems and more particularly to an arrangement for observing, on a selective basis, either calls being placed by a group of subscribers (originating mode) or calls being placed to that particular group of subscribers by someone else (terminating mode).

Service observing has as its object the maintenance of high quality telephone service. To check on the quality of service being provided, telephone companies desire periodically to monitor both the accuracy with which dialed digits are transmitted to the telephone office and the quality of the voice transmission channel established by the switching network between the calling and the called telephone customers. Since the customer may be expected to begin dialing immediately upon the receipt of dial tone, and since it is desired to check all the digits which the customer dials, it is essential that the equipment for monitoring dialed digits be connected to the customer's line even before dial tone is applied to the line.

The only indication that a customer is about to dial is the off-hook condition of his telephone set and, since this is the same indication that the central office switching equipment detects to initiate the furnishing of dial tone, it is essential that the service observing equipment be connectable with great rapidity. The quality of the voice transmission channel can be checked only after the switching network has established a connection between the calling and called parties. However, it is not the desire of the telephone company to "eavesdrops" upon the private conversations of the parties. Therefore the observing equipment should be able to rapidly make the desired observations and disconnect the observer from the monitored line as soon as the called party answers and an adequate sample of speech has been obtained.

Heretofore service observing equipment was available for monitoring originating calls through the use of circuitry that was responsive to the line relay operation of the observed line. Such equipment was unsuitable for use on terminating calls and, generally, monitoring of terminating calls was effected on a more or less arbitrary basis determined by the service observing attendant. It is an object of the present invention to provide a service observing system capable of automatically detecting both originating and terminating seizures of a line in a selected group of lines and to do so without requiring a separate or expensive apparatus for each type of call.

It is also an object of this invention to devise a service observing system capable of selectively observing both calls originated by and calls terminated to a particular group of lines as soon as a line is seized for use on a call of the selected mode.

Another object of this invention is to provide a service observing system capable of automatically connecting a first seized line to the observing position.

Still another object of this invention is to provide a universal system capable of observing calls on any two-wire or four-wire system.

Still a further object of this invention is to take advantage of the inherent miniaturization available through the use of semiconductor devices to provide a service observing system with the above capabilities in a compact and portable equipment package.

SUMMARY OF THE INVENTION

These and other objects of our invention are achieved by the provision of a service observing system employing a plurality of seizure detectors each individually connectable to one of the group of telephone lines to be observed. Each seizure detector is reversibly connected between one of the transmission conductors and the control conductor of one of the telephone lines so that the detector can be conditioned to detect the sequence of potential changes on the conductors characterizing a seizure of the associated line for an originating call or for a terminating call. Once one of the detectors has responded to a call in the selected mode the other detector circuits are inhibited. Advantageously, a pulse coupling circuit is employed in conjunction with one of the conductors of the observed line so that the appearance of a predetermined potential on that conductor will be effective only for a limited time to activate the detector to respond to the line seizure. In this manner the system is prevented from responding to a subsequent line seizure which may to some extent have been in the process of being completed while the system was in use on a prior seizure. Additionally, a circuit is provided for responding to the appearance of a particular potential on the other of the conductors of the associated line to prevent the detector from responding to the appearance of the aforesaid predetermined potential, but which the circuit will not cancel detector response when the particular potential appears subsequent to the initial appearance of the predetermined potential.

BRIEF DESCRIPTION OF THE DRAWING

Additional objects of our invention will become apparent upon consideration of the following description in conjunction with FIGS. 1 through 3 which together illustrate one illustrative embodiment of a service observing system in accordance with our invention.

GENERAL DESCRIPTION

Figure 1:
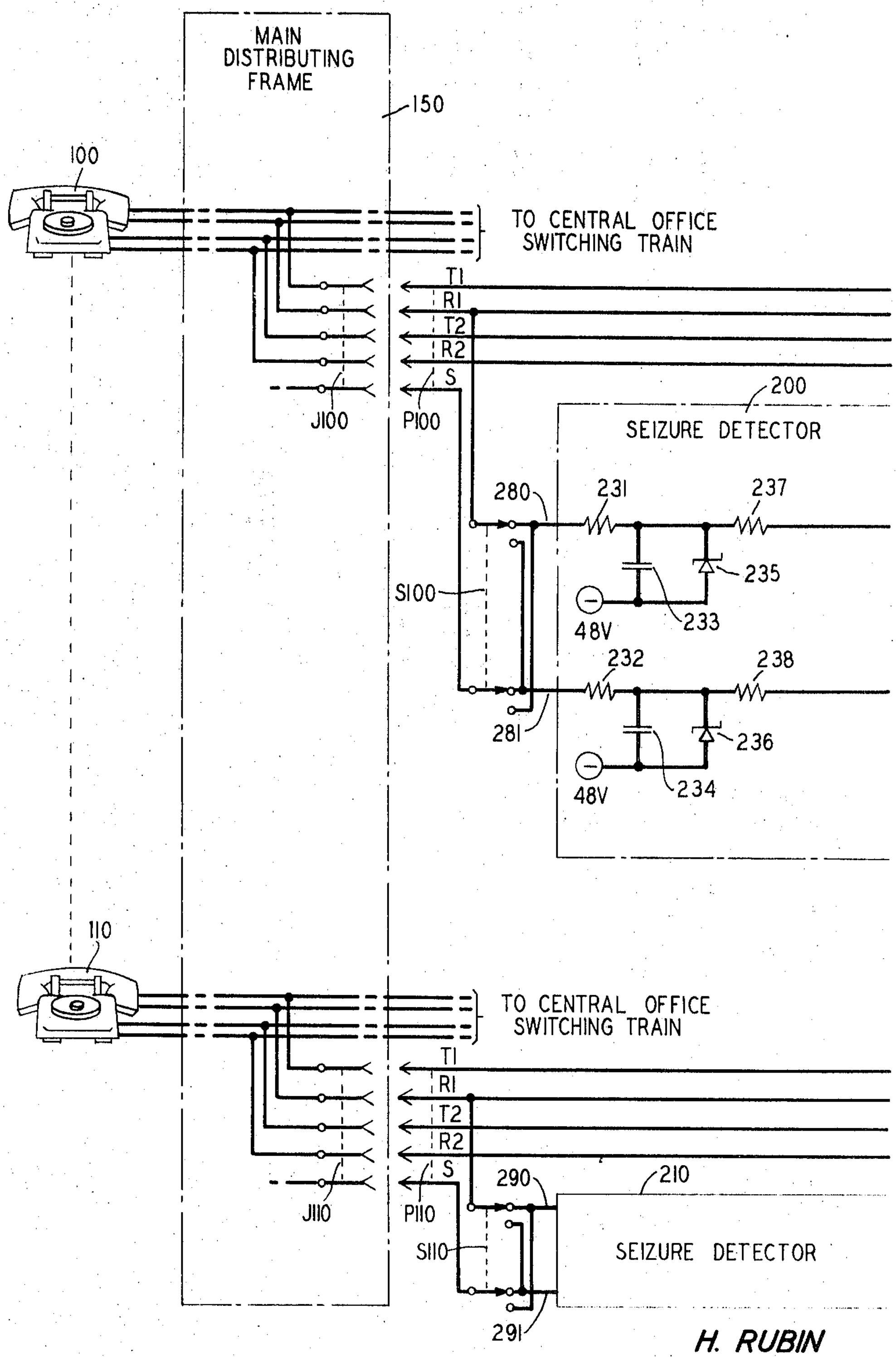

A plurality of telephone sets 100—110, as shown in FIG. 1, are connected with a main distributing frame 150 in the central office. The pairs of tip and ring leads T1, R1 and T2, R2 for each subscriber line, which for the purposes of illustration will be assumed to be of the four-wire type, appear at the respective service observing jacks J100—J110 on frame 150. In addition, the sleeve lead S of the line circuit (not shown) associated with each of the subscriber lines also appears at the respective jack J100—J110.

Figure 2:
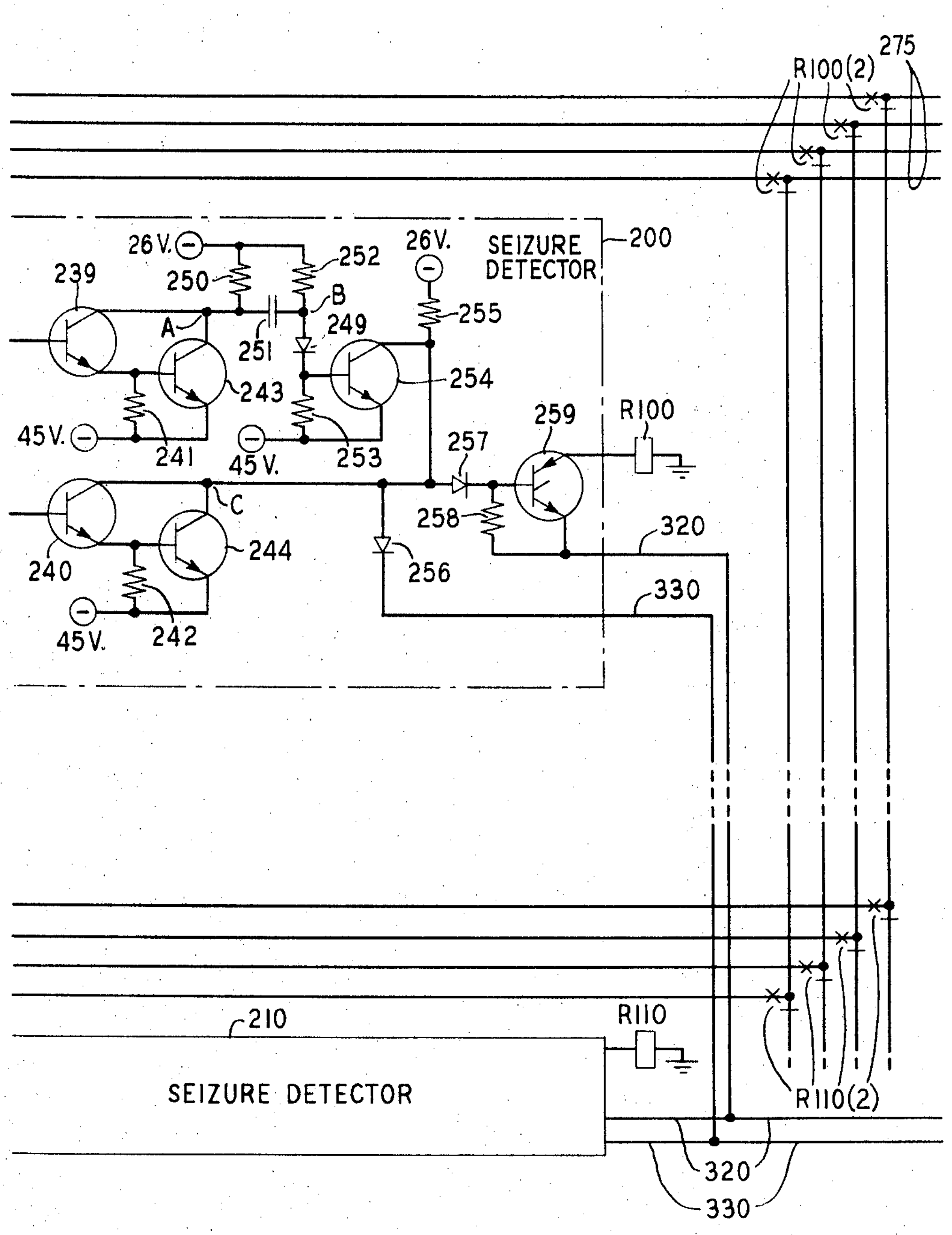
Figures 3, 4:
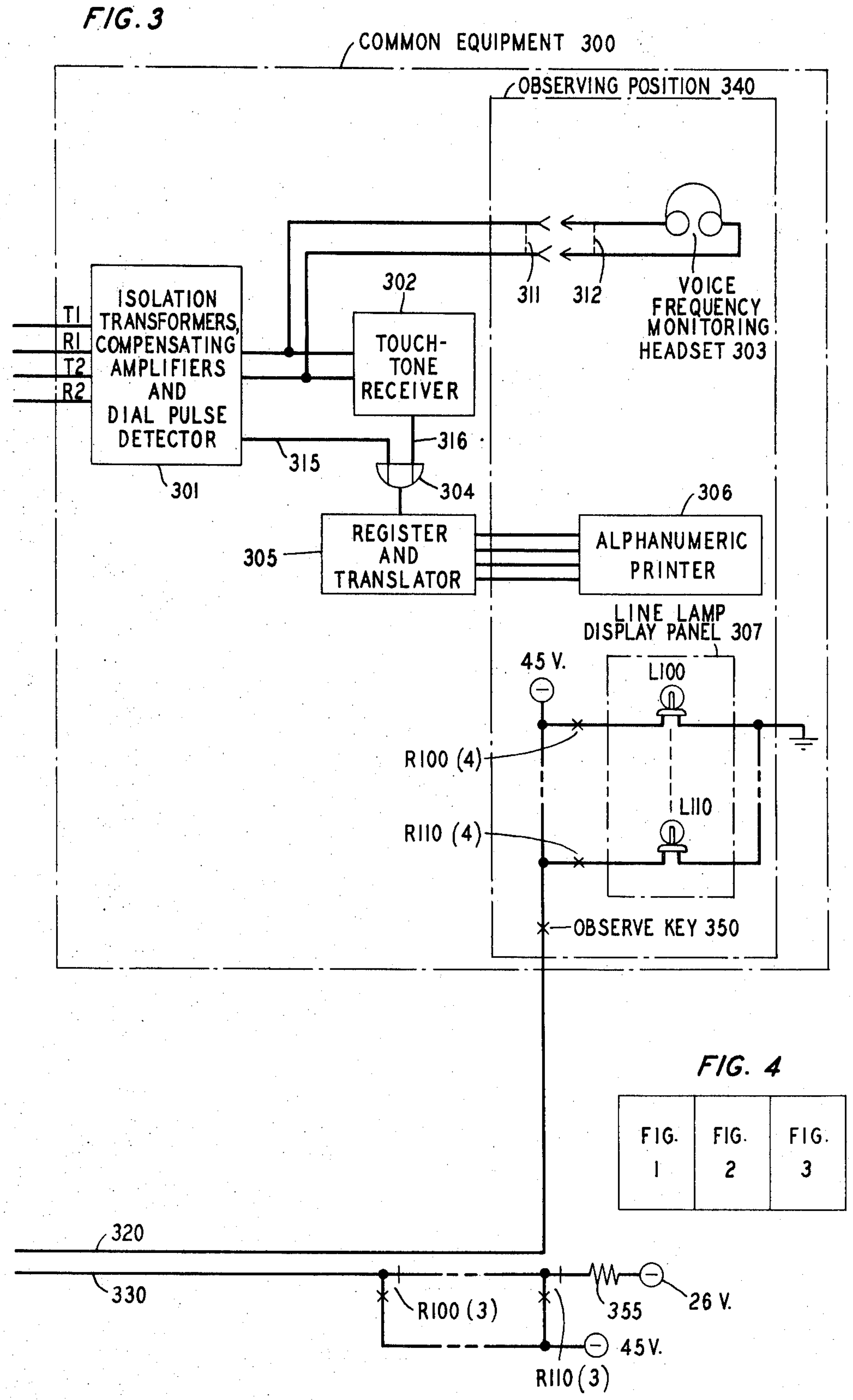
FIG. 4 shows the proper orientation of FIGS. 1 through 3.

The line seizure detector circuits 200—210, FIGS. 1 and 2, of the present invention are connectable to the frame 150 via the group of plugs P100—P110 which may be inserted into the jacks J100—J110 corresponding to the lines in the group to be placed under observation. While only 10 such seizure detector circuits have been indicated, it is to be understood that any conveniently large number might be chosen. At the input to each seizure detector is a respective mode selection switch S100—S110 and at the output of each detector is a respective relay R100—R110 (FIG. 2) for connecting one of the group of lines under observation with the common equipment 300 (FIG. 3). The operation of any one of relays R100—R110 will cause a disabling potential to be applied over lead 330 to the remaining seizure detectors 200—210, as will be explained later in detail, thereby preventing more than one simultaneous observation seizure. Transfer contacts R100 (two)—R110 (two) of relays R100—R110 are connected in preference lockout chain so that upon operation of any one of these relays, the operated break contact of the aforementioned transfer contacts isolates all lower priority lines from the common equipment 300 thereby preventing both the interconnection of two lines and the simultaneous connection of two lines to the common equipment 300.

The seizure detectors 200—210 may be conditioned to respond to the seizure of any one of the lines 100—110, selectively in either the originating mode or the terminating mode, by the positioning of the mode selector switches S100—S110 (FIG. 1) which advantageously may be mechanically or electrically linked to operate together. The first one of the telephone lines to be seized in the selected mode will actuate its respective seizure detector circuit 200—210 which, in turn, will operate the associated relay R100—R110. Relay R100—R110, in operating, at the make contact of its transfer contacts R100(two)—R110(two), cuts through the tip and ring leads of that particular subscriber to the common equipment 300, FIG. 3. In addition all of the other seizure detectors circuits will be prevented from thereafter responding to the seizure of any of the remaining telephone lines in the group under observation.

When the tip and ring leads of the first seized line have been cut through to the common equipment 300, the dial pulses or TOUCH-TONE signals transmitted by the line will be detected by either dial pulse detector 301 or TOUCH-TONE receiver 302, each of which is connected by a respective lead 315,316 to OR gate 304. The called number digits detected by either the dial pulse detector 301 or the TOUCH-TONE receiver 302 will be forwarded over the respective leads 315 or 316 through OR gate 304 to register and translator 305 which controls the operation of printer 306. Printer 306 provides the observing attendant with a printed indication of the called numbers transmitted over the line on an originating call. The tip and ring leads of the transmit and receive pairs of the selected line are combined by amplifier 301, whose outputs are connected to TOUCH-TONE receiver 302 and which also appear at jack 311. The observing attendant is provided with a monitoring headset 303 which may be connected via plug 312 to the combined pairs of the transmission line to observe the voice frequency quality of the transmission channel. At the conclusion of the observation, the observing attendant releases the operated seizure detector 200—210 by releasing observe key 350 thereby disconnecting the observed line from the service observing equipment; as will be explained later in detail.

In a conventional telephone system, when a subscriber's telephone is placed in the off-hook condition to initiate a call, the potential of the ring lead changes from the idle central office battery potential of approximately −48 volts to a loop potential approaching −24 volts. The central office switching equipment (not shown) detects this change and causes the potential of the sleeve lead to change from the −48 volt idle condition potential to ground potential. Dial tone will then be applied to the loop, following which the subscriber may dial digits which will alternately open and close the loop. However, in central offices of the crossbar variety it is observed that for a short period of time after the completion of dialing, the potential of the sleeve lead will undergo a momentary change to −48 volts as the marker connects to the originating register. As will be described hereinafter in detail, detectors 200—210 are arranged to discriminate against this change.

It will also be recalled that, in a conventional telephone system, when a line is seized for the purpose of completing a terminating call, the potential of the sleeve lead will change from −48 volts to ground. An AC ringing voltage will then be applied to the ring lead superimposed upon the −48 volt DC potential. As soon as the call is answered by the called subscriber, the potential of the ring lead will approach −24 volts and the ringing voltage will be discontinued. Mode selectors S100—S110 are arranged to switch detectors 200—210 so that the detectors may selectively respond to the sequence of potentials characterized either originating calls or terminating calls.

DETAILED DESCRIPTION

Assume for the purposes of illustration that it is desired to observe a group of lines including lines 100—110. When it is desired to observe calls in the originating mode, the mode selection switches S100—S110 will be set so that the upper ones of the leads 280—290 at the left-hand side of each detector circuit 200—210 will be connected to the ring lead R1 of its respective plug P100—P110, and correspondingly, so that the lower leads 281—291 will be connected to the sleeve lead S of its respective plug.

It will be assumed for the moment that the line for telephone set 100 will be the seized line under all circumstances so that the possible operating patterns may be illustrated. When it is desired to observe a call, the observe key 350 (FIG. 3) will be operated by the observing attendant. This causes enabling potential of −45 volts to be applied through the make contact key 350 to lead 320, and hence to seizure detectors 200—210. As we assumed, telephone set 100 is the first line to go off-hook and originate a call. Its ring lead R1 will change potential from −48 volts toward −24 volts. Lead R1 is connected to the base of transistor 239 over a path including resistors 231 and 237. Transistor 239 turns on, turning on transistor 243. The potential of point A at the collectors of transistors 239 and 240 will change from −26 to −45 volts. The differentiating network comprising resistors 250 and 252 and capacitor 251 will couple the potential change to diode 249 instantaneously back biasing the diode and turning off the normally operated transistor 254. With transistor 254 turned off, the potential at the bottom of resistor 255 rises and becomes sufficient to forward bias diode 257 allowing PNPN device 259 to turn on. Operation of PNPN device 259 allows relay R100 to receive operating battery from lead 320. Operation of relay R100 connects the line for set 100 to the observing equipment over bus 275 via the R100(two) contacts. As capacitor 251 charges, diode 249 again becomes forward biased, allowing transistor 254 to turn back on. PNPN device 259 however remains conducting and relay R100 remains operated.

Upon the seizure of any line and the resultant operation of its associated relay R100—R110, a line lamp L100—L110 on display panel 307 at the observing position 340 will operate through a contact R100(four)—R110 (four) of its associated relay R100—R110 to indicate the identity of the seized line. Operation of any relay R110—R110 at its contacts (three) transfers lead 330 from the normal −26 volt battery and resistor 355 to off-normal −45 volt battery. Application of −45 volt battery to lead 330 prevents any other seizure detector from forward-biasing the control electrode of its PNPN device corresponding to PNPN device 259 of seizure detector 200. In this manner only one of seizure detectors 200—210 can be cut through to common equipment 300 at one time.

As mentioned above, one characteristic of a crossbar switching system is that, at the completion of dialing and during the time that the crossbar marker connects to the originating register, the sleeve is temporarily ungrounded. While the ungrounding of the sleeve will have no effect on a line which has already operated its associated relay R100 in the service observing circuit, this condition of the line, i.e. battery on the ring and sleeve ungrounded resembles a new seizure. Suppose that while seizure detector 200 was in use observing a call in progress on line 100, line 110 initiated a call. The initiation of this call by line 110 will cause its transistors 239 and 243 to turn on and its transistor corresponding to transistor 254 to turn off. Seizure detector 210 will not, however, be able to operate relay R110 because relay R100 is operated at its contact R100(3), and applies −45 volt battery to lead 330 thereby preventing the PNPN device of detector 210 from being forward biased. After a short interval however, the capacitor of detector 210 corresponding to capacitor 251 of detector 200 recharges and turns on its transistor corresponding to transistor 254. With this transistor on, detector 210 is no longer attempting to forward bias its PNPN device corresponding to device 259. Now, even though the attendant completes observation of line 100 and releases key 350 at the very instant that the crossbar system is connecting an originating register to the crossbar marker for line 110, the transistor of detector 210 corresponding to transistor 254 will not be turned off by the momentary ungrounding of line 110's sleeve lead. Accordingly, detector 210 will not be inadvertently cut-through to common equipment 300.

If a terminating call is placed to the line for set 100 with switches S100—S110 still set in the originating sequence mode, seizure detector circuits 200—210 will not respond. Under these circumstances the sleeve lead potential changes from −48 volts to ground as the central office switching equipment (not shown) seizes the called line. Application of ground to the sleeve lead and lead 281 causes transistors 240 and 244 to turn on. The potential of point C at their collectors will change to −45 volts thereby back-biasing diode 257 and PNPN device 259. PNPN device 259 is now unable to turn on when the ring lead thereafter changes from −48 volts to −24 volts causing transistors 239 and 243 to turn on and transistor 254 to turn off. Transistors 240 and 244 in the conducting state draw sufficient current through resistor 255 to maintain a negative potential at the control electrode of PNPN device 259 even when transistor 254 is off. In this way, seizure detector 200 will ignore the terminating seizure when it is arranged to respond to originating seizures.

When the selector switches S100—S110 are operated so that ring leads R1 are connected to the input leads 281—291 and the sleeve leads S are connected to input leads 280—290, respectively, the seizure detectors 200—210 will be responsive to calls in the terminating mode. If one of the telephones, such as the one for line 100 goes off hook to originate a call, the potential of ring lead R1 and input lead 281 will undergo a change from −48 volts toward −24 volts. Transistors 240 and 244 will turn on and clamp the input to diode 257 to −45 volts. Diode 257 and PNPN device 259 are thus prevented from being forward biased despite any subsequent change in potential on input lead 280. Again it has been shown that seizure detector 200 will not respond to a seizure in the wrong mode.

If, on the other hand, selector switches S100—S110 are positioned for the terminating mode, and a terminating call is made to line 100, the potential of the sleeve lead and of input lead 280 will change from −48 volts to ground and transistors 239 and 243 will conduct, thereby changing the potential of point A to −45 volts. This potential change appears instantaneously at point B thereby cutting off the normally operated transistor 254. The collector of transistor 254 will change from −45 volts to approximately −26 volts. Diode 257 will be forward biased and current will flow into the gate terminal of PNPN device 259. PNPN device 259 will turn on and remain conducting, unaffected by any subsequent change in potential of the ring lead and input lead 281 from −48 volts to −24 volts.

At the completion of an observation, the observing attendant will release observe key 350 which momentarily interrupts the −45 volt potential on lead 320. This will release the activated PNPN device, such as device 259, and release the associated relay, such as relay R100. Reactuation of the observed key 350 will enable the seizure detectors 200—210 and permit them to operate to signify a subsequent seizure in the selected mode.

The Zener diodes connected to the inputs of the seizure detectors 200—210, such as diodes 235 and 236, prevent damage to the circuits caused by lightning or other high potential surges. Each diode provides a shunt to battery in parallel with the input capacitors, such as 233 and 234. A large negative voltage appearing on either input to the detector will be shunted away by the forward biased diode. A large positive voltage appearing on an input will cause the input diode 235 or 236 to break down before its associated transistor 239 or 240.

To isolate the seizure detector from whatever noise may be present on the transmission paths and from "short hits," an integrating network is provided at each input lead of the detector. For example, at the input lead 280 of detector 200 is an integrating circuit consisting of resistor 231 and capacitor 233. Similarly, an integrating circuit consisting of resistor 232 and capacitor 234 is inserted at input lead 281. The appearance of a "hit," or a short burst of potential, will be shunted to battery through the capacitors, thereby having no effect on transistors 239 or 240.

In the illustrative embodiment the emitters of transistors 243 and 244 have been supplied from −45 volt battery to compensate for normal variations in potential on the −48 volt central office battery present on the ring and sleeve leads. The use of −45 volt battery results in a slight back biasing of these transistors when the associated line is idle. Due to the relatively large potential changes occurring upon seizure of the line, the forward biasing of these transistors, when it is desired to operate them, is easily insured.

Although a four-wire system has been illustrated it is to be understood that this invention is equally applicable to a two-wire system in which case only a single transmission pair per line would be provided for its associated jack J100—J110 on frame 150 in the central office. Also, it will be apparent that this invention is applicable to any type of common telephone switching system by simple changes which would be obvious to a technician skilled in the art. For example, in a system employing E and M signaling, rather than the loop signaling, the connections shown to the ring lead R1 of J100—J110, would be connected to the E lead and the connections shown to the S lead of jack J100—J110 would be connected, after being brought through a signal inverter, to the M lead.

It is to be understood that the above-described arrangements are illustrative of the application of the principles of this invention; numerous other arrangements may be devised by those skilled in the art without departing from the spirit and scope of the invention.

We claim:

1. A service observing system for a telephone switching system having a plurality of line circuits each having a transmission conductor and a control conductor comprising:
a service observing position;
a plurality of detector circuits, each including:
a relay individual to each line effective when operated for connecting said transmission conductor to said observing position;
first and second voltage detector means for respectively detecting the presence of predetermined potentials on said control conductor and on said transmission conductor of said line circuit;
pulse means connected to said first voltage detector means for generating a pulse of predetermined duration in response to the operation of said first voltage detector means; and
switch means connected to said pulse means and normally controlled by said generated pulse in the absence of the operation of said second voltage detector means for operating said relay to connect one of said line circuits to said service observing position.

2. A system in accordance with claim 1 wherein said transmission conductor forms one of a pair of transmission conductors belonging to said line circuit and wherein each of said detector circuits further comprises selector means for reversibly connecting said first and second voltage detector means between one of said pair of conductors and said control conductor of said line circuit.

3. A system in accordance with claim 1 wherein said switch means includes:
current supply means connectable to a source of current for operating said relay; and wherein
said second voltage detector means is connected to said current supply means to draw current from said supply means to maintain said relay in an unoperated state.

4. A control circuit for detecting seizures of lines in a service observing system comprising:
a first and a second input;
switch means having a control electrode for maintaining said switch means in a nonconductive state and for biasing said switch means to a conductive state, said electrode being thereafter ineffective to return said switch means to said nonconductive state;
source means connected to said electrode and to a current supply;
shunt means connected to said current source means for normally drawing a current from said source to maintain said switch means in said nonconductive state;
means for disabling said shunt means from drawing said current from said source for a predetermined time in response to the appearance of a predetermined potential at said second input; and
means effective during the presence of a predetermined potential at said first input for drawing an additional current from said source to prevent said switch means from being rendered conductive.

5. A circuit in accordance with claim 4 wherein said disabling means includes a capacitor coupled to said shunt means and arranged to be normally charged and resistance path means enabled by the appearance of said predetermined potential at said second input for discharging said charged capacitor.

6. A service observing system for a telephone switching system having a plurality of line circuits each having an associated pair of transmission conductors and a control conductor, the potential on one of said transmission conductors normally undergoing a change prior to a change in potential on said control conductor when the associated line is seized as a calling line and undergoing said change afterwards when said associated line is seized as a called line, said system comprising;

a service observing position;

a group of detector means connectable to said lines;

relay means for selectively connecting said lines to said observing position;

switch means individual to said detector means, said switch means having a control electrode for maintaining said switch means in a nonconductive state and for biasing said switch means to a conductive state, said electrode being thereafter ineffective to return said switch means to said nonconductive state;

source means connected to said electrode and to a current supply;

shunt means connected to said source means for normally drawing a current from said source to maintain said switch means in said nonconductive state;

means for disabling said shunt means from drawing said current from said source for a predetermined time in response to the sequence of potential changes associated with one mode of seizure of a connected one of said line.

means effective in response to the sequence of potential changes associated with seizure of said connected line in the other mode for drawing an additional current from said source to prevent said switch means from being rendered conductive; and means controlled by the operation of said relay means for connecting an additional shunt path to said control electrode of each of said group of detectors to inhibit the operation of any other of said group of detectors.

7. A service observing system for a telephone switching system having a plurality of lines each having at least a pair of transmission conductors and a line circuit associated with each of said lines including a control conductor, one of said transmission conductors normally undergoing a potential change prior to a change in potential on said control conductor when said line is seized as a calling line and undergoing said change afterwards when said line is seized as a called line, comprising:

a service observing position;

a plurality of relay means for connecting said lines to said position;

seizure detector means energizable to operate at least one of said relay means and including;

first voltage detector means connected to said one conductor, second voltage detector means connected to said control conductor, and switch means connected to said first and second voltage detector means for energizing said seizure detector means when said first voltage detector operates in the absence of the operation of said second voltage detector means indicative of seizure of said line as a calling line, and a plurality of selector means for changing the connection of said first voltage detector means to said control conductor and said second voltage detector to said one conductor, so that energization of said seizure detector means in response to the operation of said first voltage detector in the absence of the operation of said second voltage detector is indicative of seizure of said line as a called line.

8. A system in accordance with claim 7 further comprising means responsive to operation of any of said relay means for inhibiting the subsequent operation of any switch means to prevent the connection of more than one line to said position coincidentally.

9. A system in accordance with claim 7 wherein said switch means includes a PNPN transistor device.

10. A service observing system, in which a service observing position is selectively connectable to a plurality of telephone lines each having a transmission path and a control conductor, comprising:

a plurality of control circuits for detecting seizures of the lines, each of said plurality of control circuits including:

a first and second input connectable selectively to both the transmission path and the control conductor of one of said lines, switch means having a control electrode for maintaining said switch means having a control electrode for maintaining said switch means in a nonconductive state and for biasing said switch means to a conductive state, said electrode being thereafter ineffective to return said switch means to said nonconductive state, source means connected to said electrode and to a current supply, shunt means connected to said source means for normally drawing a current from said source to maintain said switch means in said nonconductive state, means for disabling said shunt means from drawing said current from said source for a predetermined time in response to the appearance of a predetermined potential at said second input, means effective during the presence of a predetermined potential at said first input for drawing an additional current from said source to prevent said switch means from being rendered conductive, and a relay individually controlled by each of said switch means for connecting an additional shunt path to said control electrode of each of said plurality of control circuits.

11. A service observing system in accordance with claim 10 wherein said relay includes a contact for selectively connecting one of said plurality of lines to said service observing position.